Oct. 31, 1939.   C. NIELSEN, JR   2,178,490
SEALED FLUID-ACTUATED DEVICE
Filed Sept. 14, 1936
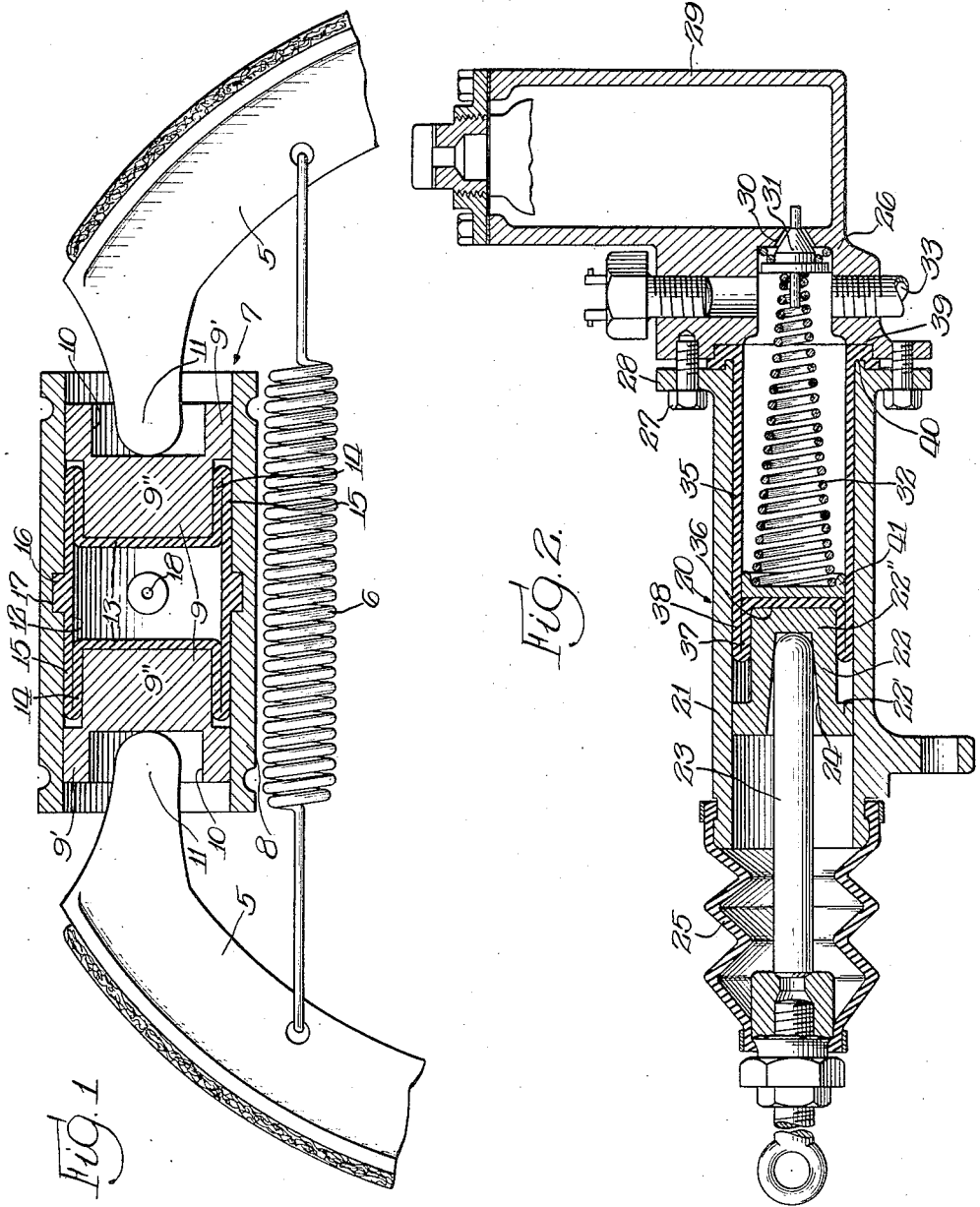
Inventor:
Christian Nielsen Jr., Patented Oct. 31, 1939

2,178,490

UNITED STATES PATENT OFFICE

2,178,490

SEALED FLUID-ACTUATED DEVICE

Christian Nielsen, Jr., River Forest, Ill., assignor to Walter L. F. Nielsen

Application September 14, 1936, Serial No. 100,603

6 Claims. (Cl. 60—54.6)

The invention relates generally to sealed fluid-actuated devices and more particularly to the sealing means thereof.

A general object of the invention is to provide a new and improved sealing means for a fluid-actuated device resulting in a minimum of wear on the sealing means.

A more particular object of the invention is to provide a sealing means having fluid-actuated devices in which there is no stretching or distortion of the sealing means.

Other objects and advantages will become apparent from the following detailed description taken in connection with the accompanying drawing, in which:

Fig. 1 is a sectional view of a fluid-actuated device having a sealing means embodying the features of the invention.

Fig. 2 is a sectional view of a fluid pump having a sealing means embodying the features of the invention.

For purposes of disclosure the invention is shown in the drawing and will hereinafter be described in detail as embodied in the fluid-actuated means and the fluid pumping means of a hydraulic braking system for automotive vehicles, it being essential in such a system that there be no leakage of operating fluid. Referring to Fig. 1, the reference characters 5 indicate the brake shoes which are contracted by a tension spring 6 to release the brake and are expanded to apply the brake by the fluid-actuated means generally designated 7. This fluid-actuated means comprises a cylinder 8 and opposed pistons 9 reciprocable therein. Each piston is formed in its exposed face with a recess 10 in which a rounded finger 11 of the brake shoe 5 is received. Moreover, each piston has a portion 9' which has a sliding fit with the cylinder and a portion 9" of reduced diameter to form an annular space between the piston and the cylinder. Preferably the reduced portion 9" of the piston has its side walls parallel with the cylinder and not tapering toward the face of the piston.

Operating fluid is supplied to the cylinder between the pistons in order to separate the same and thereby apply the brake. In order to prevent such fluid from leaking past the pistons, which would be detrimental to the operation of the braking system, sealing means is provided for preventing such escape of fluid. As shown in Fig. 1, this sealing means takes the form of a generally cylindrical sack 12 of a flexible material impervious to fluid, rubber being a satisfactory material. This sack is closed at each end by a portion 13 adapted to overlie the face of the pistons 9. Between each closed end and the middle, the sack is folded upon itself to form parallel walls 14 and 15 disposed in the annular space formed between the reduced portion of the piston 9 and cylinder 8. The walls 14 and 15 are in sliding engagement with one another so that no fluid can enter between the walls. Intermediate its ends the sack is formed with an annular reinforcing rib 16 which is received in an annular groove 17 formed in the cylinder so as to anchor the sack. This rib also serves as a means to which the inner end of a conduit 18 opening to the interior of the sack is secured. The sack 12 is manufactured in halves and then preferably vulcanized together to form the reinforcing rib 16.

It will be apparent from the foregoing that the sack is anchored only intermediate its ends, thereby enabling the parallel walls 14 and 15 to vary in length without distortion during movement of the pistons 9. The reduced portions 9" of the pistons are made long enough so that the annular space formed therebetween and the cylinder is ample to receive the walls 14 and 15 when the pistons are in their innermost position, as shown in Fig. 1. Moreover the pistons are designed so that in their outward movement the walls 14 and 15 will not be wholly withdrawn from the annular space. With this arrangement there is no stretching or distortion of the sack and thus no fatigue and no danger that the sack will tear during stretching. Moreover, with the walls 14 and 15 in sliding contact, no fluid can enter between the walls to place a stress on the sack at the fold therein.

In Fig. 2 the invention is shown incorporated in a pump generally designated 20 which is actuated to supply operating fluid to the brake actuating device 7. The pump comprises generally a cylinder 21, a piston 22 reciprocable in the cylinder, and an actuating rod 23 for moving the piston in a direction to discharge fluid from the cylinder. The piston 22 is again formed with a portion 22' slidably engaging the cylinder and a portion 22" of reduced diameter providing an annular space between the piston and the cylinder. The rod 23 engages in a recess 24 in the piston and the end of the cylinder through which the rod 23 projects is sealed by a bellows 25.

The cylinder 20 is secured to a block 26 by means of bolts 27 extending through a flange 28, formed on the cylinder, and threaded into the block 26. This block has formed integral therewith a container 29 for storing a reserve supply of fluid under pressure and communicates with the cylinder through a port 30. The port is controlled by a check valve 31 urged toward closed position by a compression spring 32 which also serves to effect a return or intake stroke of the piston 22. The pump discharges through a conduit 33 which leads to the brake-actuated device 7.

Means is provided for sealing the pump which embodies the features of the means disclosed in Fig. 1. Herein this means takes the form of a generally cylindrical sack 35 of a flexible material impervious to fluid, such as rubber. This sack has a portion 36 closing one end thereof and near the closed end is folded upon itself to to provide parallel walls 37 and 38 disposed in the annular space formed between the reduced portion of the piston and the cylinder. The other end of the sack is open and at that end is formed with a generally Z-shaped reinforcing and anchoring rib 39. This rib is clamped between the flange 28 on the cylinder and the block 26. The cylinder has a longitudinally extending flange 40 which engages in an annular groove formed by the Z-shape of the rib 39 and thus effectively prevents the rib from being pulled out from between the flange 28 and the block 26. Preferably there is interposed between the end portion 36 of the sack and the spring 32 a cupped washer 41 to prevent the end of the spring from wearing the sack.

Like the sack disclosed in Fig. 1, the sack 35 is anchored only at its open end, thereby permitting the walls 37 and 38 to vary the length without distortion during movement of the piston 22. Furthermore fluid cannot enter between the walls and thus no fluid pressure is applied to any portion of the sack that is not backed by the piston or the cylinder.

I claim as my invention:

1. A seal for a fluid-actuated device having a cylinder with an annular grove intermediate its ends and opposed pistons with portions of reduced diameter operating in the cylinder comprising a single, generally cylindrical sack of flexible rubber having ends adapted to overlie the faces of the pistons, the sack at each end being folded upon itself to form parallel walls in sliding engagement with each other interposed between the reduced portion of the piston and the cylinder, an annular reinforcing rib formed on the exterior of the sack intermediate the ends thereof and received in the annular groove in the cylinder to anchor the sack against longitudinal movement, said annular rib being the only means for securing the sack thereby enabling the parallel walls to vary in length and without distortion during the movement of the pistons, and a conduit opening to the interior of the sack through the annular rib and secured thereto.

2. A seal for a fluid-actuated device having a cylinder with an annular groove intermediate its ends and opposed pistons with portions of reduced diameter operating in the cylinder comprising a single generally cylindrical sack of flexible material impervious to fluid having ends adapted to overlie the faces of the pistons, the sack at each end being folded upon itself to form parallel walls in sliding engagement with each other interposed between the reduced portion of the piston and the cylinder, an annular reinforcing rib formed on the exterior of the sack intermediate the ends thereof and received in the annular groove in the cylinder to anchor the sack against longitudinal movement, said annular rib being the only means for securing the sack thereby enabling the parallel walls to vary in length and without distortion during the movement of the pistons, and a conduit opening to the interior of the sack through the annular rib and secured thereto.

3. A fluid-actuated device comprising a cylinder having an annular groove formed intermediate its ends, opposed pistons operating in said cylinder and having portions of reduced diameter at the inner ends of the pistons, and means for sealing the device against leakage of operating fluid comprising a single generally cylindrical sack of flexible material impervious to fluid having ends adapted to overlie the faces of the pistons, the sack at each end being folded upon itself to form parallel walls in sliding engagement with each other interposed between the reduced portion of the piston and the cylinder, a conduit opening to the interior of the sack, and an annular reinforcing rib formed on the exterior of the sack intermediate the ends thereof and received in the annular groove in said cylinder to anchor the sack, said rib forming the only anchor means for the sack whereby the parallel walls may vary in length without distortion during movement of the pistons, the reduced portions of the pistons being of such length that the annular space formed between the reduced portions and the cylinders will receive the parallel walls at the maximum inward movement of the pistons.

4. In a fluid-actuated device having a cylinder and opposed pistons having portions of reduced diameter operating in the cylinder, means for sealing the device against leakage of operating fluid comprising a single generally cylindrical sack of flexible material imprevious to fluid having ends adapted to overlie the faces of the pistons, the sack at each end being folded upon itself to form parallel walls in sliding engagement with each other interposed between the reduced portion of the piston and the cylinder, the walls varying in length without distortion during longitudinal movement of the pistons, and an annular reinforcing rib formed on the exterior of the sack intermediate the ends thereof providing an anchor for the sack and a means to which a conduit opening to the interior of the sack may be secured.

5. A seal for a fluid-actuated piston operable in a cylinder comprising a sack of flexible material impervious to fluid having a closed end adapted to overlie the face of the piston, the sack near its closed end being folded upon itself to provide parallel walls interposed between the piston and the cylinder, the walls varying in length without distortion during longitudinal movement of the piston and being of sufficient thickness to fill completely the space intermediate the piston and cylinder wall so as to prevent fluid from entering between the overlapped portions of the sack, and an annular reinforcing and anchoring rib formed on the exterior of the sack spaced from the closed end thereof.

6. A fluid-actuated device comprising a cylinder, a piston operable in said cylinder having a reduced inner end portion, the sides of which are parallel with the cylinder, and a seal for the device comprising a generally cylindrical sack of flexible material impervious to fluid having a closed end adapted to overlie the face of the piston, the sack near its closed end being folded upon itself to provide parallel walls interposed between the reduced portion of the piston and the cylinder and being of sufficient thickness to fill completely the space intermediate the piston and cylinder wall so as to prevent fluid from entering between the overlapped portions of the sack, and an annular reinforcing and anchoring rib formed on the exterior of the sack spaced from the closed end thereof and constituting the sole anchoring means for said sack whereby the parallel walls may vary in length without distortion during movement of the piston.

CHRISTIAN NIELSEN, Jr.